United States Patent
Li et al.

(10) Patent No.: US 11,363,488 B2
(45) Date of Patent: Jun. 14, 2022

(54) CONGESTION CONTROL METHOD AND RELATED DEVICE

(71) Applicant: Huawei Technologies Co., Ltd., Shenzhen (CN)

(72) Inventors: Yexing Li, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 16/751,022

(22) Filed: Jan. 23, 2020

(65) Prior Publication Data

US 2020/0162962 A1 May 21, 2020

Related U.S. Application Data

(63) Continuation of application No. PCT/CN2018/090866, filed on Jun. 12, 2018.

(30) Foreign Application Priority Data

Jul. 27, 2017 (CN) .......................... 201710637331.X

(51) Int. Cl.
*H04W 28/02* (2009.01)
*H04W 24/02* (2009.01)

(52) U.S. Cl.
CPC ....... *H04W 28/0289* (2013.01); *H04W 24/02* (2013.01); *H04W 28/0236* (2013.01)

(58) Field of Classification Search
CPC .......................... H04W 28/0289; H04W 24/02
See application file for complete search history.

(56) References Cited

U.S. PATENT DOCUMENTS

| | | | | |
|---|---|---|---|---|
| 10,050,884 | B1* | 8/2018 | Dhanabalan | ........ H04L 43/0864 |
| 10,075,379 | B2* | 9/2018 | Jung | ........ H04L 45/72 |
| 2005/0286416 | A1* | 12/2005 | Shimonishi | ........ H04L 47/2416 370/229 |
| 2006/0114830 | A1* | 6/2006 | Shimonishi | ........ H04L 69/163 370/241 |
| 2006/0171313 | A1* | 8/2006 | Shimonishi | ........ H04L 47/283 370/229 |

(Continued)

FOREIGN PATENT DOCUMENTS

| | | |
|---|---|---|
| CN | 101964755 A | 2/2011 |
| CN | 104243342 A | 12/2014 |

(Continued)

*Primary Examiner* — Parth Patel
(74) *Attorney, Agent, or Firm* — Slater Matsil, LLP

(57) ABSTRACT

Embodiments of the present disclosure disclose a congestion control method and a related device. The method may include: learning, by an application server from a communications device, that a terminal device has handed over from a source cell to a target cell; detecting, by the application server, a round-trip time RTT and a bandwidth BW; and determining, based on detection values of the RTT and the BW, whether network congestion occurs on the link from the application server to the terminal device. By using this application, in some communication scenarios, a probability that a transmit end enters a network congestion control phase in advance due to erroneous determining may be reduced, and utilization of network bandwidth is improved.

14 Claims, 10 Drawing Sheets

(56) References Cited

U.S. PATENT DOCUMENTS

| | | | |
|---|---|---|---|
| 2007/0121511 A1* | 5/2007 | Morandin | H04L 69/16 370/235 |
| 2008/0085712 A1* | 4/2008 | Han | H04W 36/04 455/440 |
| 2009/0175191 A1* | 7/2009 | Lin | H04L 43/0829 370/253 |
| 2010/0034089 A1* | 2/2010 | Kowali | H04L 67/28 370/235 |
| 2010/0061251 A1* | 3/2010 | Nassor | H04N 7/173 370/242 |
| 2010/0228824 A1* | 9/2010 | Lin | H04L 12/1818 709/204 |
| 2011/0116373 A1* | 5/2011 | Lauer | H01Q 1/007 370/232 |
| 2011/0149730 A1* | 6/2011 | Nemeth | H04L 47/25 370/234 |
| 2011/0188390 A1* | 8/2011 | Kwag | H04L 43/00 370/252 |
| 2012/0028642 A1* | 2/2012 | Schliwa-Bertling | C12N 5/0686 455/436 |
| 2012/0071201 A1* | 3/2012 | Chisaka | H04W 36/0055 455/525 |
| 2013/0114408 A1* | 5/2013 | Sastry | H04L 47/27 370/231 |
| 2013/0229916 A1* | 9/2013 | Isobe | H04L 1/1835 370/230 |
| 2013/0297743 A1* | 11/2013 | Eschet | H04L 65/60 709/219 |
| 2013/0304934 A1* | 11/2013 | Joch | H04L 65/607 709/231 |
| 2014/0064249 A1* | 3/2014 | Lee | H04W 36/0033 370/331 |
| 2015/0043332 A1* | 2/2015 | Nylander | H04L 69/16 370/229 |
| 2015/0263924 A1* | 9/2015 | Thapliya | H04L 12/4641 370/252 |
| 2016/0198359 A1 | 7/2016 | Ryu et al. | |
| 2016/0205164 A1* | 7/2016 | Schmidt | H04N 21/8456 709/219 |
| 2016/0323421 A1* | 11/2016 | Sakurai | H04L 69/163 |
| 2017/0135009 A1* | 5/2017 | Ling | H04L 1/0023 |
| 2017/0149666 A1* | 5/2017 | Kiykioglu | H04L 47/27 |
| 2017/0195231 A1* | 7/2017 | Lopez Serrano | H04L 47/14 |
| 2017/0310593 A1 | 10/2017 | Kong et al. | |
| 2018/0019952 A1* | 1/2018 | Li | H04L 69/161 |
| 2018/0132110 A1* | 5/2018 | Furuichi | H04L 47/70 |
| 2018/0139642 A1* | 5/2018 | Yoshida | H04W 88/18 |
| 2018/0159778 A1* | 6/2018 | Lee | H04L 47/193 |
| 2018/0220325 A1* | 8/2018 | Lee | H04W 72/1236 |
| 2018/0254979 A1* | 9/2018 | Scahill | H04L 47/193 |
| 2018/0324237 A1* | 11/2018 | Johansson | H04L 65/608 |
| 2019/0019267 A1* | 1/2019 | Suresh | G06F 9/5077 |
| 2020/0112514 A1* | 4/2020 | Fraser | H04L 47/225 |
| 2020/0162962 A1* | 5/2020 | Li | H04W 28/0289 |

FOREIGN PATENT DOCUMENTS

| | | |
|---|---|---|
| CN | 105557026 A | 5/2016 |
| CN | 105847168 A | 8/2016 |
| KR | 20100073890 A | 7/2010 |

* cited by examiner

CONGESTION CONTROL METHOD AND RELATED DEVICE

CROSS-REFERENCE TO RELATED APPLICATIONS

This application is a continuation of International Application No. PCT/CN2018/090866, filed on Jun. 12, 2018, which claims priority to Chinese Patent Application No. 201710637331.X, filed on Jul. 27, 2017. The disclosures of the aforementioned applications are hereby incorporated by reference in their entireties.

TECHNICAL FIELD

The present disclosure relates to the field of communications technologies, and in particular, to a congestion control method and a related device.

BACKGROUND

A transmission control protocol (TCP) is a connection-oriented, reliable, and byte stream-based transport layer communication protocol. A TCP congestion control mechanism means that a data size, a data sending rate, and the like are adjusted based on network transmission performance and a network transmission status. This avoids network congestion and collapse, and ensures reliability of data transmission in a packet network.

A lower RTT ensuring (Bottleneck Bandwidth and RTT, BBR) algorithm is a TCP congestion control algorithm, and an RTT is a round-trip time (RTT). The BBR algorithm aims at utilizing a bandwidth of a network link with a specific packet loss rate to a maximum extent on the network link, and reducing an occupation rate of a buffer of a data packet on the network link. This reduces a latency when bandwidth guarantee is implemented. In the BBR algorithm, it is detected whether the RTT reaches a previously detected minimum RTT or smaller value within a time period; and if not, it is determined that network congestion occurs on the link.

However, in some communication scenarios, a transmit end may enter a network congestion control phase in advance because of erroneous determining, and consequently utilization of a network bandwidth is reduced.

SUMMARY

A technical problem is resolved in the embodiments of the present disclosure by providing a congestion control method and a related device, so that a problem that a terminal device in a communications system may fail to effectively perform network congestion control by using a BBR algorithm after a cell handover occurs is resolved.

According to a first aspect, an embodiment of the present disclosure provides a congestion control method. The method includes: learning, by an application server from a communications device, that a terminal device has handed over from a source cell to a target cell; detecting, by the application server, a round-trip time (RTT) and a bandwidth (BW), where the BW is an available bandwidth of a link from the application server to the terminal device; and determining, by the application server, based on detection values of the RTT and the BW, whether network congestion occurs on the link from the application server to the terminal device. In this embodiment of the present disclosure, after a cell handover occurs on the terminal device, the application server may determine, based on both of the detection values of the RTT and the BW, whether the network congestion occurs on the application server side. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

In a possible implementation, the communications device is the terminal device, a target base station, or a core network element, and the target cell is a serving cell of the target base station. Various kinds of communications devices notify the application server that the cell handover has occurred on the terminal device, so that the application server adjusts subsequent congestion control according to the notification.

In a possible implementation, the core network element includes any one of a packet data network gateway (P-GW), a serving gateway (S-GW), a service capability exposure function SCEF network element, an access and mobility management function (AMF) network element, a session management function (SMF) network element, and a user plane function (UPF) network element. The various kinds of communications devices notify the application server that the cell handover has occurred on the terminal device, so that the application server adjusts the subsequent congestion control according to the notification.

In a possible implementation, the detecting, by the application server, a round-trip time RTT and a bandwidth BW includes: adjusting, by the application server, a gain coefficient G of a data packet sending rate to 1; and detecting, by the application server, a round-trip time (RTT) and a bandwidth (BW) within a first time period after the terminal device has handed over from the source cell to the target cell. In a process of detecting the round-trip time (RTT) and the bandwidth (BW), the application server adjusts, to 1, the gain coefficient of the rate of sending the data packet, in other words, keeps a current rate of sending the data packet unchanged. In this way, after the cell handover occurs on the terminal device, the application server may detect an RTT and BW of a new transmission path within the first time period without being affected by a fluctuation of the rate of sending the data packet. Therefore, whether congestion occurs in a current network is determined more objectively and accurately.

In a possible implementation, the method further includes: determining, by the application server, a minimum RTT and a maximum BW within the first time period. The determining, by the application server based on detection values of the RTT and the BW, whether network congestion occurs on the link from the application server to the terminal device includes: if the minimum RTT is greater than a historical minimum RTT and the maximum BW is less than a historical maximum BW, determining, by the application server, that the network congestion occurs on the link from the application server to the terminal device, where the historical minimum RTT is a minimum RTT detected by the application server before the terminal device hands over from the source cell to the target cell, and the historical maximum BW is a maximum BW detected by the application server before the terminal device hands over from the source cell to the target cell. After the cell handover occurs on the terminal device, the application server detects the RTT and the BW of the new transmission path within the first time period, and determines that the network congestion occurs currently when determining that the RTT has an increasing tendency and the BW has a decreasing tendency.

In a possible implementation, the method further includes: if the minimum RTT is greater than the historical minimum RTT and the maximum BW is greater than or equal to the historical maximum BW, determining, by the application server, that no network congestion occurs on the link from the application server to the terminal device. After the cell handover occurs on the terminal device, the application server detects the RTT and the BW of the new transmission path within the first time period, and determines that no network congestion occurs currently when determining that the RTT has an increasing tendency but the BW does not have a decreasing tendency.

In a possible implementation, the method further includes: sequentially and cyclically selecting a value from n values in a preset set N for G, where n is an integer greater than or equal to 1. After the cell handover occurs on the terminal device, the application server detects the RTT and the BW of the new transmission path within the first time period, determines that no network congestion occurs currently when determining that the RTT has an increasing tendency but the BW does not have a decreasing tendency, and finally adjusts the gain coefficient of the data packet sending rate to the value sequentially and cyclically selected in a plurality of values in the preset set, to continue to perform BBR congestion control.

In a possible implementation, the method further includes: updating, by the application server, the historical minimum RTT to the minimum RTT within the first time period. After the cell handover occurs on the terminal device, regardless of whether the network congestion currently occurs is determined, the application server needs to use, as the historical minimum RTT, the minimum RTT that is of the new transmission path and that is detected within the first time period after the handover, so that in the new transmission path, there is a reference for determining whether congestion occurs in a subsequent network.

According to a second aspect, an embodiment of the present disclosure provides a congestion control method. The method includes: handing over, by a terminal device, from a source cell to a target cell; detecting, by the terminal device, a round-trip time (RTT) and a bandwidth (BW), where the BW is an available bandwidth of a link from the terminal device to an application server; and determining, by the terminal device based on detection values of the RTT and the BW, whether network congestion occurs on the link from the terminal device to the application server. In this embodiment of the present disclosure, after a cell handover occurs on the terminal device, the terminal device may determine, based on both of the detection values of the RTT and the BW, whether the network congestion occurs currently. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

In a possible implementation, the detecting, by the terminal device, a round-trip time RTT and a bandwidth BW includes: adjusting, by the terminal device, a gain coefficient G of a data packet sending rate to 1; and detecting, by the terminal device, a round-trip time RTT and a bandwidth BW within a first time period after the terminal device has handed over from the source cell to the target cell. In a process of detecting the round-trip time RTT and the bandwidth BW, the terminal device adjusts, to 1, the gain coefficient of the rate of sending the data packet, in other words, keeps a current rate of sending the data packet unchanged. In this way, after the cell handover occurs on the terminal device, the terminal device may detect an RTT and BW of a new transmission path within the first time period without being affected by a fluctuation of the rate of sending the data packet. Therefore, whether congestion occurs in a current network is determined more objectively and accurately.

In a possible implementation, the method further includes: determining, by the application terminal device, a minimum RTT and a maximum BW within the first time period. The determining, by the application terminal device based on detection values of the RTT and the BW, whether network congestion occurs on the link from the application server to the terminal device includes: if the minimum RTT is greater than a historical minimum RTT and the maximum BW is less than a historical maximum BW, determining, by the terminal device, that the network congestion occurs on the link from the terminal device to the application server, where the historical minimum RTT is a minimum RTT detected by the terminal device before the terminal device hands over from the source cell to the target cell, and the historical maximum BW is a maximum BW detected by the terminal device before the terminal device hands over from the source cell to the target cell. After the cell handover occurs on the terminal device, the terminal device detects the RTT and the BW of the new transmission path within the first time period, and determines that the network congestion occurs currently when determining that the RTT has an increasing tendency and the BW has a decreasing tendency.

In a possible implementation, the method further includes: if the minimum RTT is greater than the historical minimum RTT and the maximum BW is greater than or equal to the historical maximum BW, determining, by the terminal device, that no network congestion occurs on the link from the terminal device to the application server. After the cell handover occurs on the terminal device, the terminal device detects the RTT and the BW of the new transmission path within the first time period, and determines that no network congestion occurs currently when determining that the RTT has an increasing tendency but the BW does not have a decreasing tendency.

In a possible implementation, the method further includes: sequentially and cyclically selecting a value from n values in a preset set N for G, where n is an integer greater than or equal to 1. After the cell handover occurs on the terminal device, the terminal device detects the RTT and BW of the new transmission path within the first time period, determines that no network congestion occurs currently when determining that the RTT has an increasing tendency but the BW does not have a decreasing tendency, and finally adjusts the gain coefficient of the data packet sending rate to the value sequentially and cyclically selected in a plurality of values in the preset set, to continue to perform BBR congestion control.

In a possible implementation, the method further includes: updating, by the terminal device, the historical minimum RTT to the minimum RTT within the first time period. After the cell handover occurs on the terminal device, regardless of whether the network congestion currently occurs is determined, the terminal device needs to use, as the historical minimum RTT, the minimum RTT that is of the new transmission path and that is detected within the first time period after the handover, so that in the new transmission path, there is a reference for determining whether congestion occurs in a subsequent network.

According to a third aspect, this application provides an application server. The application server has a function of implementing the method in any one of the foregoing congestion control method embodiments. The function may be implemented by using hardware, or may be implemented by hardware executing corresponding software. The hardware or the software includes one or more modules corresponding to the function.

According to a fourth aspect, this application provides a terminal device. The terminal device has a function of implementing the method in any one of the foregoing congestion control method embodiments. The function may be implemented by using hardware, or may be implemented by hardware executing corresponding software. The hardware or the software includes one or more modules corresponding to the function.

According to a fifth aspect, this application provides an application server. The application server includes a processor. The processor is configured to support the application server in performing a corresponding function in the congestion control method provided in the first aspect. The application server may further include a memory. The memory is configured to be coupled with the processor, and the memory stores a program instruction and data that are required by the application server. The application server may further include a communications interface. The communications interface is configured to perform communication between the application server and another device or a communications network.

According to a sixth aspect, this application provides a terminal device. The terminal device includes a processor. The processor is configured to support the terminal device in performing a corresponding function in the congestion control method provided in the second aspect. The terminal device may further include a memory. The memory is configured to be coupled with the processor, and the memory stores a program instruction and data that are required by the terminal device. The terminal device may further include a communications interface. The communications interface is configured to perform communication between the terminal device and another device or a communications network.

According to a seventh aspect, this application provides a computer storage medium. The computer storage medium is configured to store a computer software instruction used by the application server provided in the fifth aspect. The computer software instruction includes a program designed for performing the foregoing aspect.

According to a ninth aspect, an embodiment of the present disclosure provides a computer program. The computer program includes an instruction. When the computer program is executed by a computer, the computer is enabled to perform the procedure of the congestion control method in either the first aspect or the second aspect.

According to a tenth aspect, this application provides a chip system. The chip system includes a processor. The processor is configured to support an application server or a terminal device in implementing a function in the foregoing aspects, for example, generating or processing information in the foregoing method. In a possible design, the chip system further includes a memory. The memory is configured to store a program instruction and data that are required by a data sending device. The chip system may include a chip, or may include a chip and another discrete device.

BRIEF DESCRIPTION OF THE DRAWINGS

To describe the technical solutions in the embodiments of the present disclosure or in the background more clearly, the following briefly describes the accompanying drawings required for describing the embodiments of the present disclosure or the background.

DETAILED DESCRIPTION OF ILLUSTRATIVE EMBODIMENTS

Figure 1:
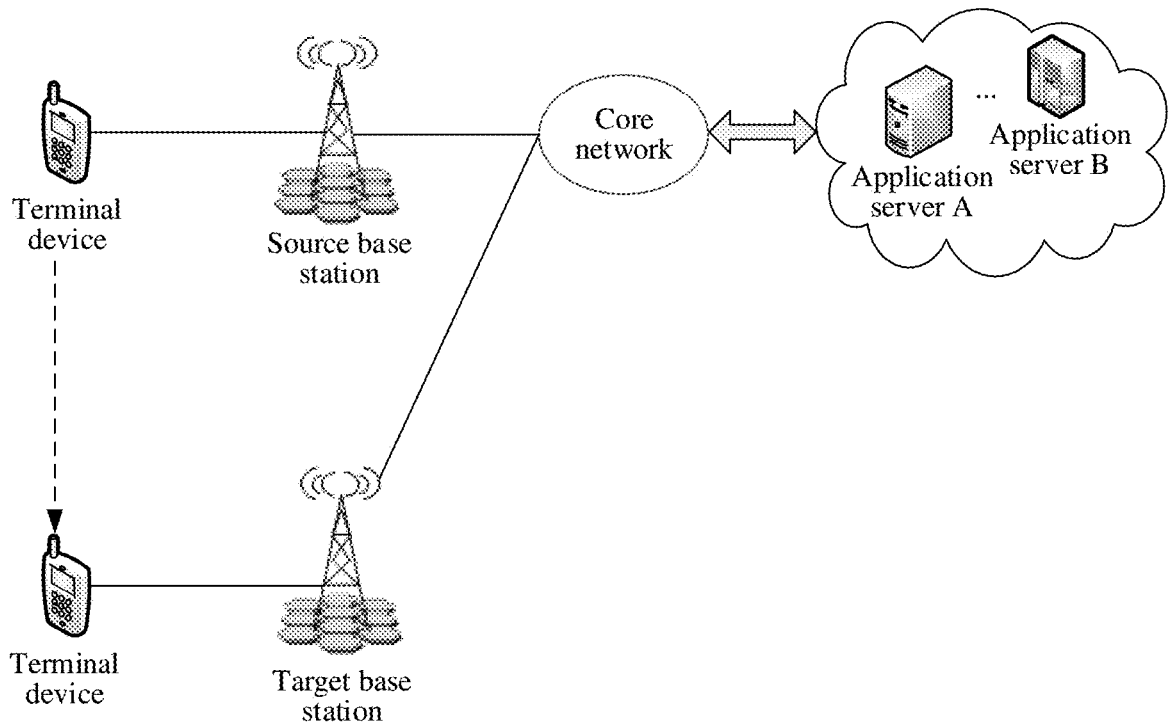
FIG. 1 is a diagram of a communications system architecture according to an embodiment of the present disclosure.

The following describes the embodiments of the present disclosure with reference to the accompanying drawings in the embodiments of the present disclosure.

In this specification, claims, and accompanying drawings of this application, the terms "first", "second", "third", "fourth", and the like are intended to distinguish between different objects but do not indicate a particular order. In addition, the terms "including", "consist of", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

Terms such as "component", "module", and "system" used in this specification are used to indicate computer-related entities, hardware, firmware, combinations of hardware and software, software, or software being executed.

For example, a component may be but is not limited to a process that runs on a processor, a processor, an object, an executable file, an execution thread, a program, and/or a computer. As shown in figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may communicate with each other by using a local and/or remote process and according to, for example, a signal having one or more data packets (for example, data from two components interacting with another component in a local system, a distributed system, and/or across a network such as the Internet interacting with other systems by using the signal).

Some terms in this application are first described, so as to help a person skilled in the art have a better understanding.

(1) Round-trip time (RTT): The round-trip time represents a total latency generated in a time period from a moment at which a transmit end sends data to a moment at which the transmit end receives an acknowledgement (ACK) fed back by a receive end (the receive end instantly sends the acknowledgement after receiving the data). It can be understood that each data packet corresponds to one RRT.

(2) Bandwidth (BW): In this application, the bandwidth is a bandwidth of a communication link between an application server and a terminal device. In other words, the bandwidth refers to a total amount of data that can be successfully transmitted on the link per second, and a unit is a bit per second and denoted as b/s. Assuming that a total amount of acknowledged data is denoted as "delivered", and a time used for acknowledging the total amount of data "delivered" is denoted as interval_us, BW=delivered/interval_us. The bandwidth indicates a current actual processing capability of a network. For example, in a process of calculating "delivered", the transmit end (the application server or the terminal device) first determines an ACK fed back by the receive end (the terminal device or the application server) within "interval_us", and then calculates a total amount of data corresponding to all feedback ACKs, in other words, a total quantity of bits of data successfully sent by the transmit end within "interval_us". The feedback ACK includes an ACK after retransmission, a normal ACK, or a selective acknowledgement (SACK). In other words, all data acknowledged by the receive end needs to be calculated.

(3) Gain coefficient (G): In this application, G is a gain coefficient of a rate at which the transmit end sends a data packet. For example, when G=2, it indicates that data is sent at a rate that is two times greater than a current data packet sending rate; or when G=1, it indicates that data is sent at the current data packet sending rate. In other words, the rate remains unchanged.

(4) Congestion window (CWnd): The congestion window refers to a maximum quantity of data packets that can be sent by the transmit end for one time in a case of congestion control. A size of the congestion window depends on a network congestion degree and dynamically changes. A principle in which the transmit end controls the congestion window is as follows: As long as no network congestion occurs, the congestion window is increased, so that more data packets are sent in groups. However, as long as network congestion occurs, the congestion window is reduced, so that a quantity of data packets transmitted in the network is reduced.

In addition, a technical problem that needs to be resolved and an application scenario in this application are proposed. In the prior art, four states are defined in a BBR algorithm based on network congestion behavior, that is, STARTUP, DRAIN, PROBE_BW, and PROBE_RTT. By continuously observing the foregoing calculated instant bandwidth BW and RTT, the BBR freely switches between the four states. Specific implementation is as follows.

State 1: START UP

In this state, the transmit end accelerates bandwidth preemption and a sending speed, and G ranges from 2 to 3. This process is similar to that of a conventional TCP. In the START UP state, the transmit end continuously updates a minimum RTT and a maximum BW.

State 2: DRAIN

In the STARTUP state, the transmit end detects a BW in real time, and compares the BW with a historical maximum BW. More than three comparisons show that the detected BW increases by no more than 25% compared with the historical maximum BW. Therefore, it is considered that the BW is to reach a link limit. In this case, the BBR algorithm switches from the STARTUP to the DRAIN state. In other words, buffered data on the link is to be overloaded, and therefore a related parameter needs to be adjusted to reduce an amount of the buffered data on the link. Therefore, the adjustment is: G=1000/2885, and the gain coefficient of the congestion window G'=(1000/2005)+1. In the DRAIN state, the transmit end continuously updates the minimum RTT and the maximum BW.

State 3: PROBE_BW

In the DRAIN state, if the transmit end obtains, through calculation, that "In-packet" is less than or equal to a current maximum BDP, it indicates that the link is to reach a steady state. In this case, the BBR algorithm enters PROBE_BW. "In-packet" is a data packet sent by the transmit end to the link in a unit time; a BDP is a bandwidth-latency product that is equal to BW×RTT; and PROBE_BW is a steady state. Therefore, adjustment is: G=Random(5/4, 3/4, 1, 1, 1, 1, 1, 1). In other words, G is sequentially and cyclically set to gain coefficients in the set.

State 4: PROBE_RTT

PROBE_RTT is a congestion processing state. In any state of the BBR, if a detected RTT does not reach (touch) a recorded minimum RTT within contiguous 10 s, it is considered that congestion occurs. In this case, adjustment is G=1, and CWnd is forcibly reduced (cut) to a minimum value, that is, four maximum packet segment lengths (Max Segment Size, MSS).

In conclusion, in the four states of the BBW algorithm, the RTT and the BW are detected in real time, and a current minimum RTT and a current maximum bandwidth BW are observed in real time. However, by analyzing the foregoing several states, it can be obtained that the instant BW serves as a basis for switching between only the first three states (for example, switching from the state 1 to the state 2 to the state 3, and switching from the state 1 to the state 3. In other words, switching may be performed between the first three states. For example, as a network congestion status changes, the BBR algorithm enters a next state or a previous state). However, a time for entering the state 4 is specifically determined. In other words, whether network congestion occurs is specifically determined by determining only whether the minimum RRT is touched within 10 s (in other words, whether a minimum RTT detected within 10 s is less than a historical minimum RTT). After a trigger condition of the foregoing RTT is met, the BBR algorithm enters a congestion processing state, for example, directly enters the state 4 from the state 1, directly enters the state 4 from the state 2, and directly enters the state 4 from the state 3. After the BBR algorithm enters the state 4, a parameter related to congestion control is adjusted.

However, in an actual communication process, the transmit end (the application server or the terminal device) and the receive end may experience different transmission environments, and consequently RTT measurement is affected. For example, a transmission path between the transmit end and the receive end changes greatly. For example, when a cell handover or a base station handover occurs in the terminal device, the transmission path between the transmit end and the receive end may be lengthened, and consequently the minimum RRT detected by the transmit end within 10 s cannot touch the historical minimum RTT. Based on the BBR algorithm, the transmit end considers that network congestion occurs currently, and therefore the gain coefficient G and the congestion window are correspondingly reduced. However, essentially, the RTT is increased only because the transmission path is lengthened, and the network congestion does not actually occur. Therefore, the transmit end enters a network congestion control state in advance, so that network bandwidth utilization is reduced, and TCP transmission efficiency is further reduced.

Therefore, the technical problem that needs to be resolved in this application is how to reduce erroneous determining of congestion control in some special scenarios, for example, a case in which a cell handover occurs on the transmission path. Therefore, according to an effective congestion control method, the transmit end can accurately perform network congestion control. This improves congestion control accuracy and data transmission efficiency.

It can be understood that the embodiments of the present disclosure may be applied to various communications systems, for example, a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), or a next-generation communications system such as a 5G radio access (New Radio Access Technology in 3GPP, NR) system referred to as a 5GNR system.

According to the foregoing descriptions, the following first describes a communications system architecture on which the embodiments of the present disclosure are based. FIG. 1 is a diagram of a communications system architecture according to an embodiment of the present disclosure. The communications system architecture may include a terminal device, a source base station, a target base station, a core network element, and at least one application server (it is assumed that the communications system architecture includes an application server A and an application server B). For example, in FIG. 1, the terminal device accesses a core network by using the source base station before a cell handover, accesses the core network by using the target base station after the cell handover, and interacts with the application server by using the core network. By way of example and not limitation, the source base station and the target base station provide a network access service for the terminal device. The core network element may provide a related service for a communication process. Different application servers (for example, the application server A and the application server B) may provide different services for the terminal device.

The terminal device in this application may be a data transmit end or a data receive end. When the terminal device is the transmit end, the application server is the receive end; or when the terminal device is the receive end, the application server is the transmit end. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN); or may be a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, and a next-generation communications system such as a terminal device in a 5th generation (fifth-generation, 5G) network or a terminal device in a future evolved public land mobile network (PLMN). It can be understood that the terminal device in this embodiment of the present disclosure may support real-time detection of an RTT and a BW, and adjust a rate of sending data by the terminal device and a congestion window according to a congestion control decision in this application.

The application server (APP server) in this application provides various services for a user (the terminal device) in a network. The application server may be a data transmit end or a data receive end. For example, when the application server is the transmit end, the terminal device is the receive end; or when the application server is the receive end, the terminal device is the transmit end. When the transmit end is the application server, the application server further learns, from another communications device, that the terminal device has completed a cell handover. The application server may be a web server, a file server, a video server, an internet protocol television (IPTV) server, a mail server, a game server, or the like. It can be understood that the application server in this embodiment of the present disclosure may support real-time detection of an RTT and a BW, and adjust a rate of sending data by the application server and a congestion window according to a congestion control decision in this application.

The core network element in this application may be a core network element in various communications systems. For example, a core network element in LTE includes a mobility management entity (MME), a packet data network gateway (PDN Gateway, P-GW, where PDN is a packet data network), a serving gateway (S-GW), or a service capability exposure function (SCEF) network element. In a 5G network, a core network element includes an access and mobility management function (AMF) network element, a session management function (SMF) network element, or a user plane function (UPF) network element. The core network element includes a control plane network element and a user plane network element. The control plane network element has functions such as policy making, session management, and mobility management. The user plane network element performs data forwarding, data processing, and the like. For example, the MME, the AMF, and the SMF are control plane network elements, and the S-GW, the P-GW, and the UPF are user plane network elements.

The source base station is an initial access base station of the terminal device, and may be a base station in various communications systems such as LTE and 5G. Within coverage of the source base station, the terminal device or the application server detects a historical minimum RTT and a historical maximum BW in this application.

The target base station is a base station accessed by the terminal device after a cell handover is completed, and may be a base station in various communications systems such as LTE and 5G. Within coverage of the target base station, the UE may update a minimum RTT and a maximum BW in the base station. This helps perform objective comparison in a same base station.

It should be noted that the cell handover in this application may be a handover between different cells of a same base station, or may be a handover between cells of different base stations. To be specific, when the cell handover in this application is the handover between the different cells of the same base station, the source base station and the target base station are actually a same base station. When the cell handover in this application is the handover between the cells of the different base stations, the source base station and the target base station are different base stations.

It can be understood that the communications system architecture in FIG. 1 is merely an example implementation in the embodiments of the present disclosure. A communications system architecture in the embodiments of the present disclosure includes but is not limited to the foregoing communications system architecture.

With reference to an embodiment of a congestion control method provided in this application, the following specifically analyzes and resolves the technical problem proposed in this application.

Figure 2:
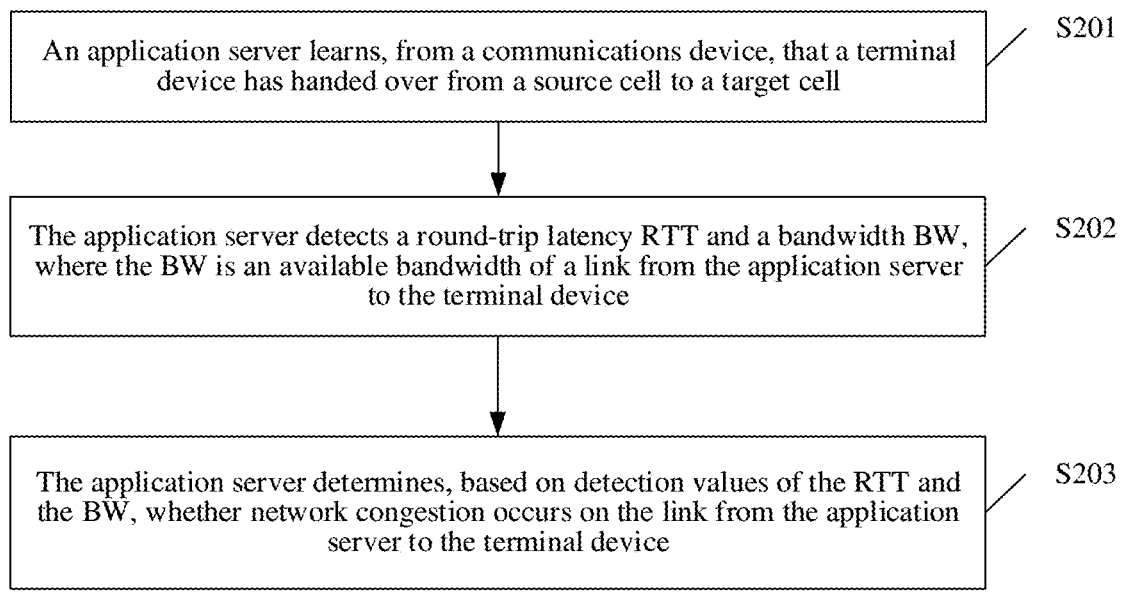
FIG. 2 is a schematic flowchart of a congestion control method according to an embodiment of the present disclosure.

FIG. 2 is a schematic flowchart of a congestion control method according to an embodiment of the present disclosure. The method may be applied to the foregoing communications system in FIG. 1. The following describes the method from an application server side with reference to FIG. 2. The method may include the following steps S201 to S203.

Step S201: An application server learns, from a communications device, that a terminal device has handed over from a source cell to a target cell.

Step S202: The application server detects a round-trip time RTT and a bandwidth BW, where the BW is an available bandwidth of a link from the application server to the terminal device.

Step S203: The application server determines, based on detection values of the RTT and the BW, whether network congestion occurs on the link from the application server to the terminal device.

In the foregoing step S201, for example, when the application server needs to send data to the terminal device, the application server is a transmit end, and the terminal device that receives the data is a corresponding receive end. When a cell handover occurs on the terminal device, the application server may learn, from the communications device, that the terminal device has handed over from the source cell to the target cell. In a possible implementation, the communications device is the terminal device on which the cell handover occurs, a target base station serving the target cell, or a core network element. For example, the terminal device may send, to the application server, indication information used to indicate that the cell handover occurs on the terminal device. Alternatively, a target base station to which the terminal device hands over may notify the application server that the cell handover occurs on the terminal device. Alternatively, a core network element between the terminal device and the application server may notify the application server that the cell handover occurs on the terminal device. In a possible implementation, the core network element includes any one of a packet data network gateway (P-GW), a serving gateway (S-GW), a service capability exposure function (SCEF) network element, an access and mobility management function AMF network element, a session management function (SMF) network element, and a user plane function (UPF) network element.

With reference to an example implementation, the following specifically describes how the application server learns, from the communications device, that the terminal device has handed over from the source cell to the target cell, to perform subsequent congestion control. First, the specific implementation is classified into two types based on different communications system architectures.

Figure 3:
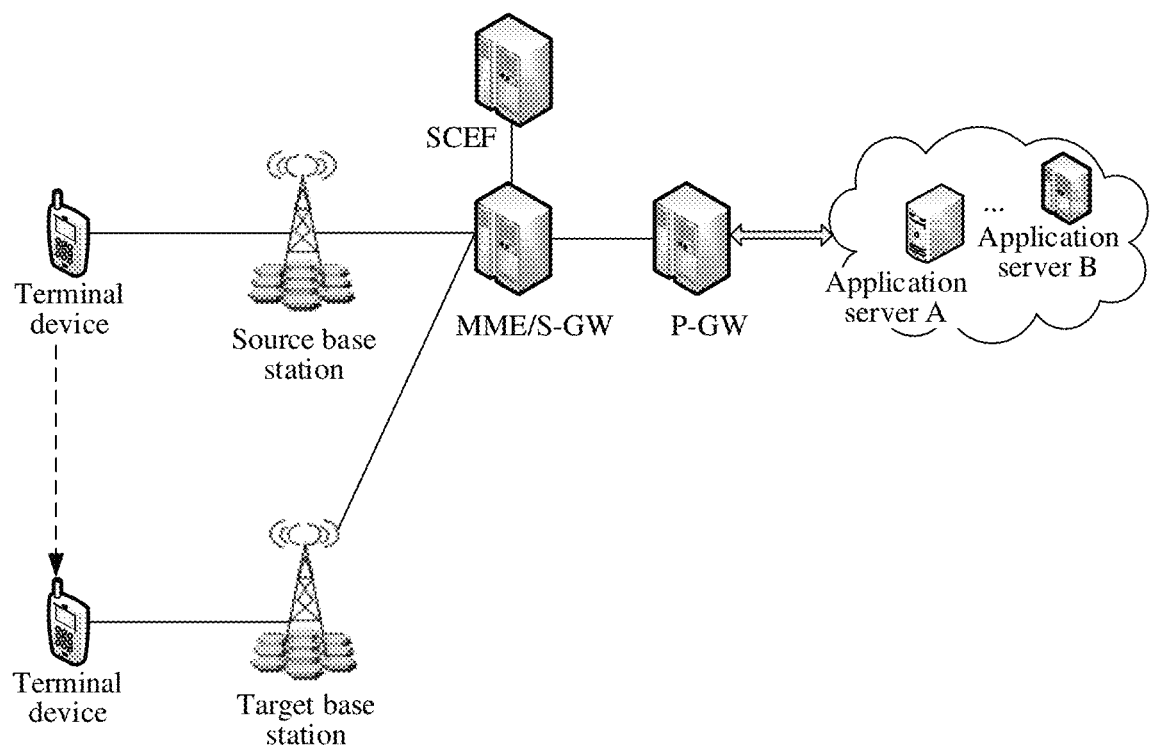
FIG. 3 is a diagram of an EPS system architecture according to an embodiment of the present disclosure.
Figure 4:
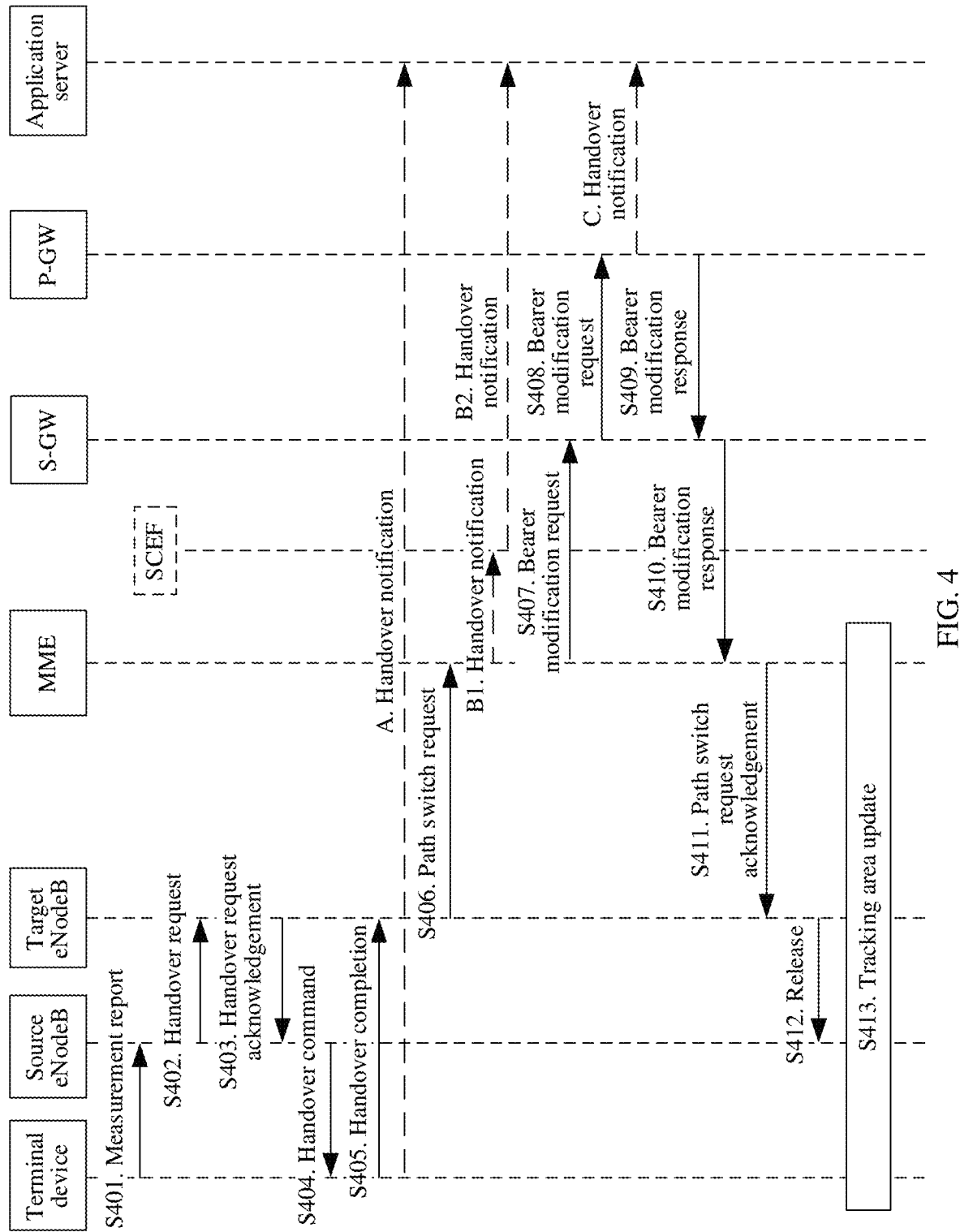
FIG. 4 is a schematic flowchart of a handover notification according to an embodiment of the present disclosure.

Type 1: A communications system architecture is an evolved packet system (EPS) architecture in an LTE system. FIG. 3 is a diagram of the EPS system architecture according to this embodiment of the present disclosure. The communications system architecture may include the terminal device, a source eNodeB, a target eNodeB, an MME, an S-GW, a P-GW, and the application server, and optionally, may further include a SCEF. FIG. 4 is a schematic flowchart of a handover notification according to this embodiment of the present disclosure. This type of implementation may be implemented based on the EPS system architecture in FIG. 3, and may specifically include the following steps S401 to S412. In addition, how the application server specifically learns from the communications device that the terminal device has handed over from the source cell to the target cell may be implemented by using any one of three solutions: A, B(B1+B2), and C.

S401. The terminal device (UE) sends a measurement report to the source eNodeB (S-eNB).

S402. The source base station finds, based on content of the measurement report, that a handover threshold is reached, and in this case, the source eNodeB sends a handover request to the target eNodeB (T-eNB).

S403. After completing a handover preparation, the target eNodeB sends a handover request acknowledgement to the source eNodeB, to confirm that a cell handover can occur.

S404. After receiving a handover request response of the target eNodeB, the source eNodeB sends a handover command to the UE.

S405. When completing a process of establishing an air interface connection to the target eNodeB, the UE sends a handover complete message to the target eNodeB.

S406. The target eNodeB sends a path switch request to the MME, where the path switch request carries an identifier (ID) of the target eNodeB.

S407. The MME sends a bearer modification request to the S-GW, where the bearer modification request carries the ID of the target eNodeB, and in this case, a downlink bearer can be established between the S-GW and the target eNodeB.

S408. The S-GW sends the bearer modification request to the P-GW.

S409. The P-GW feeds back a bearer modification response to the S-GW.

S410. The S-GW feeds back the bearer modification response to the MME.

S411. The MME feeds back a path switch request acknowledgement to the target eNodeB.

S412. Finally, the target eNodeB instructs the source eNodeB to release a resource of the terminal device.

Solution A: After completing the process of establishing the air interface connection to the target eNodeB, the UE sends a handover notification to the application server (APP Server). This step may be performed after step S405, to be specific, after the UE completes the process of establishing the air interface connection to the target eNodeB, and before step S406.

The solution B includes steps B1 and B2. B1: After receiving the path switch request, the MME sends a handover notification to the SCEF, where the handover notification carries IP information of the UE. B2. After receiving the handover notification sent by the MME, the SCEF sends the handover notification to the application server, where the notification carries the IP information of the UE. After receiving the notification, a transport layer protocol of the application server can find, based on the IP information of the UE, a transport layer connection corresponding to the UE. In this way, the congestion control method in this application is performed. Steps B1 and B2 in the solution B are performed after step S406 and before step S407.

Solution C: After receiving the bearer modification request sent by the S-GW, the P-GW sends a handover notification to the APP server by using a data plane (data channel), where the handover notification carries IP information of the UE. After receiving the notification, a transport layer protocol of the application server can find, based on the IP information of the UE, a transport layer connection corresponding to the UE. In this way, the congestion control method in this application is performed. This step is performed after S408 and before S409.

Figure 5:
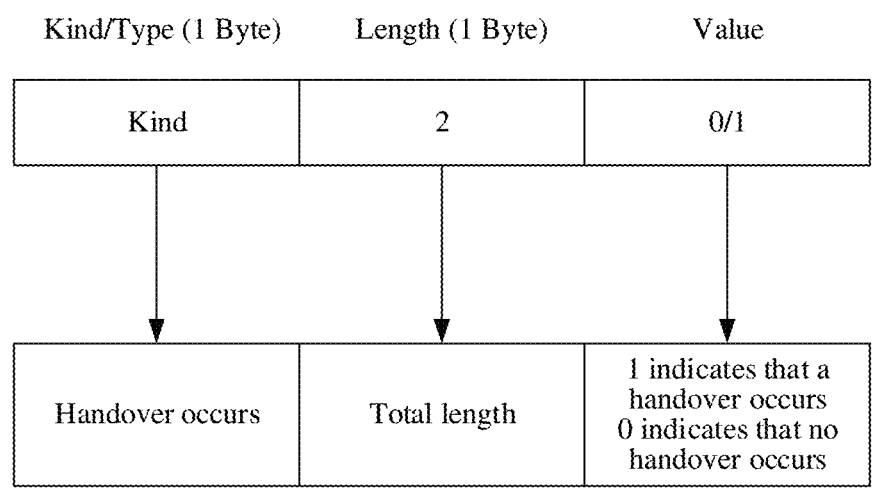
FIG. 5 is a schematic diagram of a transmission format of a handover notification according to an embodiment of the present disclosure.

In a possible implementation, for the foregoing solution A in FIG. 4, the UE may send the handover notification to the application server by using signaling or by using a transport layer protocol. FIG. 5 is a schematic diagram of a transmission format of the handover notification according to this embodiment of the present disclosure. For example, when the transport layer protocol is in an existing TCP format, the transmission format may be defined according to a format of an option field in the TCP format in FIG. 5. For example, the option field starts with "Kind" of one byte that indicates a type of the option (for example, whether the type is a type indicating information about a handover), "Length" indicates a total length of the option (including "Kind" and "Length"), and a specific value of "Value" is used to indicate whether a cell handover occurs. If a value of "Value" is 0, it indicates that no cell handover occurs on the UE, and a value of "Value" is 1, it indicates that the cell handover occurs on the UE. It can be understood that the transmission format shown in FIG. 5 may be some bytes or all bytes in the option field. It may be further understood that, in FIG. 5, only one expression form of the option field is provided. A value of "Kind", a length of "Length", a value of "Value", and corresponding meanings are not specifically limited in this embodiment of the present disclosure.

In this embodiment of the present disclosure, in the existing 4G EPS network architecture, the terminal device UE, the SCEF, or the P-GW notifies the application server that the cell handover occurs on the terminal device, so that the application server may perform the congestion control method in this application after the cell handover occurs on the terminal device. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

Figure 6:
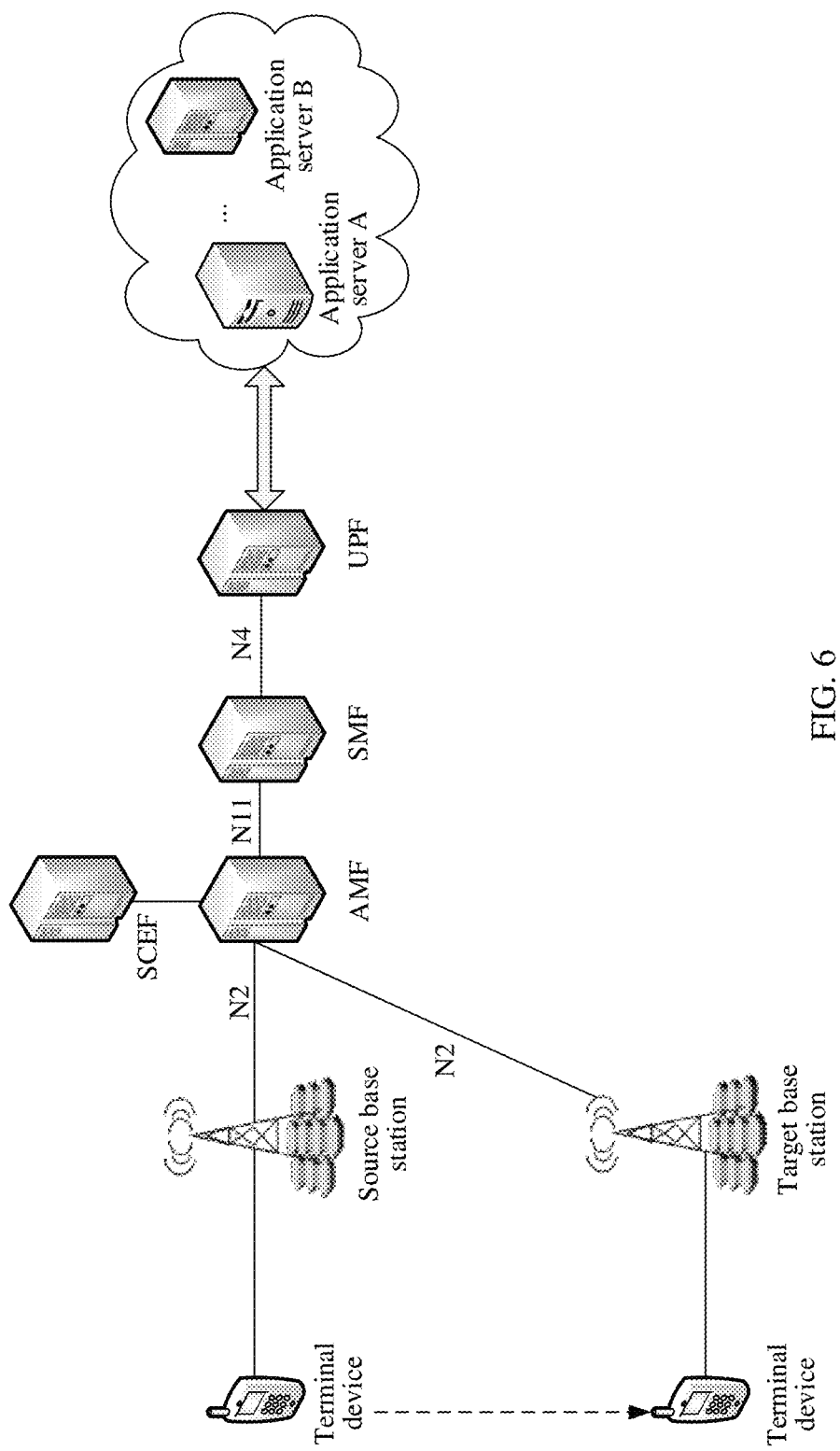
FIG. 6 is a diagram of a 5G system architecture according to an embodiment of the present disclosure.
Figure 7:
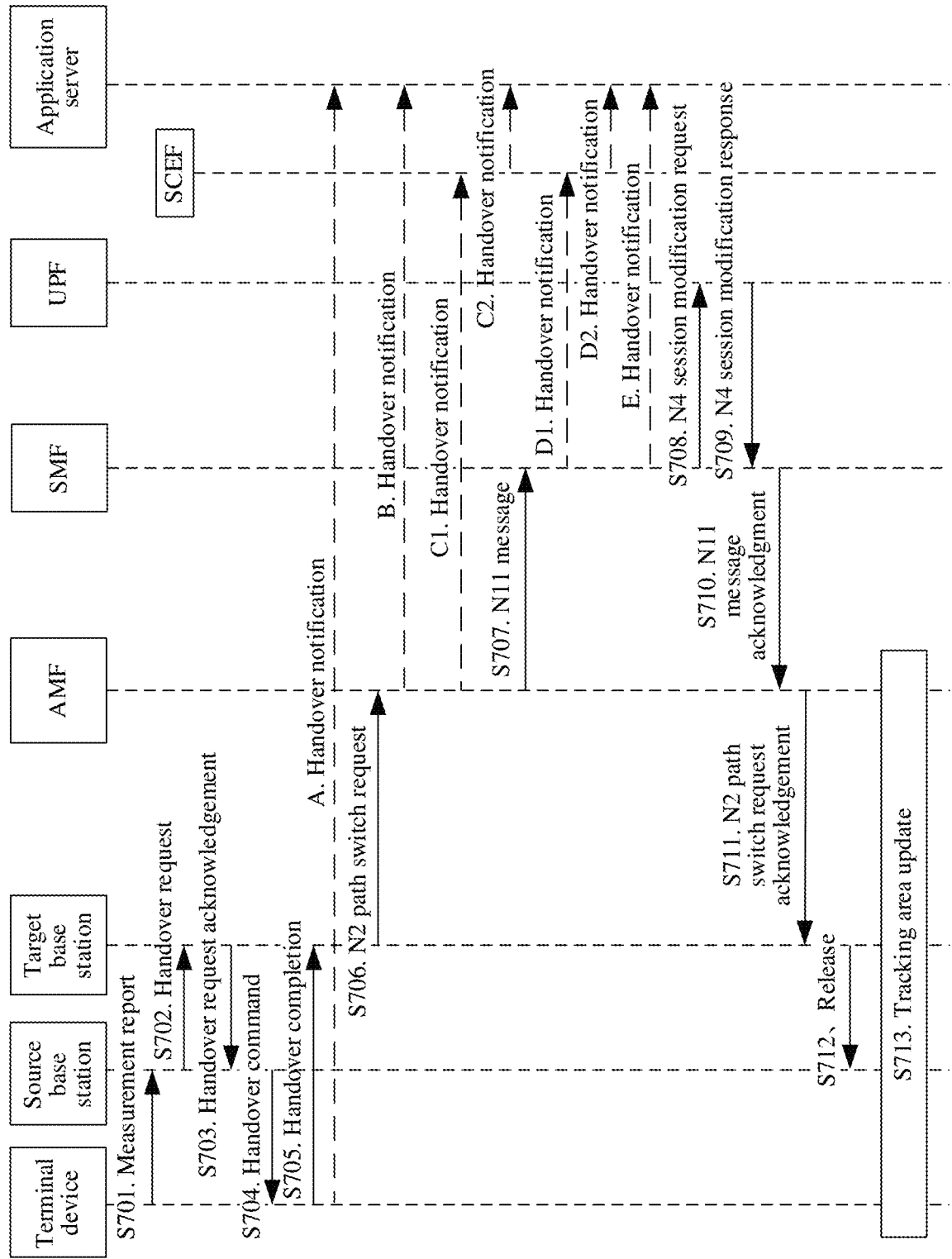
FIG. 7 is a schematic flowchart of another handover notification according to an embodiment of the present disclosure.

Type 2: The communications system architecture is a 5G communications system architecture. FIG. 6 is a diagram of the 5G system architecture according to this embodiment of the present disclosure. The communications system architecture may include the terminal device, a source RAN, a target RAN, an AMF, an SMF, a UPF, and the application server, and optionally, may further include a SCEF. N2 is an interface between the target RAN and the AMF, N11 is an interface between the AMF and the SMF, and N4 is an interface between the SMF and the UPF. FIG. 7 is a schematic flowchart of another handover notification according to this embodiment of the present disclosure. This type of implementation may be implemented based on the 5G system architecture in FIG. 6, and may specifically include the following steps S7001 to S712. In addition, how the application server specifically learns from the communications device that the terminal device has handed over from the source cell to the target cell may be implemented by using any one of five solutions: A, B, C(C1+C2), D(D1+D2), and E.

S701. The terminal device (UE) sends a measurement report to the source RAN (S-RAN).

S702. The source RAN finds, based on content of the measurement report, that a handover threshold is reached, and in this case, the source RAN sends a handover request to the target RAN (T-RAN).

S703. After completing a handover preparation, the target RAN sends a handover request acknowledgement to the source RAN, to confirm that a cell handover can occur.

S704. After receiving a handover request response of the target RAN, the source RAN sends a handover command to the UE.

S705. When completing a process of establishing an air interface connection to the target RAN, the UE sends a handover complete message to the target RAN, so that the UE completes a handover from the source RAN to the target RAN, where the handover includes a handover preparation and a handover performing phase.

S706. The target RAN sends an N2 path switch message to the AMF, to notify the AMF that the UE has handed over from the source cell to the target cell, where the N2 path switch message includes information about the target RAN, for example, QoS information, and a tunnel endpoint identifier of the target RAN.

S707. The AMF sends an N11 message to the SMF, to instruct PDU sessions to be handed over to the target RAN, where the N11 message carries information about the PDU session.

S708. After receiving a PDU session request, the SMF sends an N4 session modification request to the UPF, where the N4 session modification request message may include a RAN address, endpoint information of a downlink tunnel, and the like.

S709. After PDU session handover is completed, the UPF sends an "N4 Session modification Response" message to the SMF.

S710. The SMF sends an N1 message acknowledgement (N11 Message ACK) to the AMF, to indicate that the PDU session handover succeeds.

S711. The AMF sends an N11 message response to the target RAN, to indicate that the PDU session handover succeeds.

S712. The target RAN sends a resource release indication to the source RAN, to instruct the source RAN to release a resource.

Solution A: After completing a bearer establishment request with the target RAN, the UE sends a handover notification to the application server (APP Server). This step may be performed after step S705, to be specific, after the UE completes the process of establishing the air interface connection to the target RAN, and before step S706.

Solution B: After receiving the N2 path switch request, the AMF sends a handover notification to the application server, where the handover notification carries IP information of the UE. After receiving the notification, a transport layer protocol of the application server can find, based on the IP information of the UE, a transport layer connection corresponding to the UE. In this way, the congestion control method in this application is performed. This step is performed after S706 and before S707.

The solution C includes steps C1 and C2. C1: After receiving the N2 path switch request, the AMF sends a handover notification to the SCEF. C2: After receiving the handover notification sent by the AMF, the SCEF sends the handover notification to the application server, where the handover notification carries IP information of the UE. After receiving the notification, a transport layer protocol of the application server can find, based on the IP information of the UE, a transport layer connection corresponding to the UE. In this way, the congestion control method in this application is performed. Steps C1 and C2 in the solution C are performed after step S706 and before step S707.

The solution D includes steps D1 and D2. D1: After receiving the N11 message sent by the AMF, the SMF sends a handover indication to the SCEF. D2: After receiving the handover notification sent by the SMF, the SCEF sends the handover notification to the APP server, where the handover notification carries IP information of the UE. After receiving the notification, a transport layer protocol of the application server can find, based on the IP information of the UE, a transport layer connection corresponding to the UE. In this way, the congestion control method in this application is performed. Steps D1 and D2 in the solution D are performed after step S707 and before step S708.

Solution E: After the SMF receives the N11 message sent by the AMF, the SMF sends a handover notification to the APP server, where the handover notification carries IP information of the UE. After receiving the notification, a transport layer protocol of the application server can find, based on the IP information of the UE, a transport layer connection corresponding to the UE. In this way, the congestion control method in this application is performed. This step is performed after S707 and before S708.

In a possible implementation, for the foregoing solution A in FIG. 7, the UE may send the handover notification to the application server by using signaling or by using a transport layer protocol. For the handover notification sent by the UE to the application server by using the transport layer protocol, refer to the schematic diagram of the transport format of the handover notification and a corresponding description provided in FIG. 5. Details are not described herein again.

In this embodiment of the present disclosure, in the architecture in which decoupling is performed between a control plane and a user plane in the future 5G communications system, the terminal device UE, the AMF, the SCEF, or the SMF notifies the application server that the cell handover occurs on the terminal device, so that the application server may perform the congestion control method in this application after the cell handover occurs on the terminal device. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

In the foregoing step S202, for example, after learning that the terminal device completes the cell handover, the application server detects the RTT and the BW of the application server in real time. The RTT is a total latency generated between sending of the data by the application server and receiving, by the application server, of an acknowledgement from the terminal device (the terminal device instantly sends the acknowledgement after receiving the data). The BW is a quantity of bits of data corresponding to a quantity of ACKs that are fed back by the terminal device and that are received by the application server within a unit of time. In a performing process of the congestion control method in this application, the application server tracks a current minimum RTT (historical minimum RTT) and current maximum bandwidth BW (historical maximum BW).

In a possible implementation, in a specific process of detecting the round-trip time RTT and the bandwidth BW, the application server first adjusts a gain coefficient G of a data packet sending rate to 1, in other words, keeps the sending rate unchanged, and then detects a round-trip time RTT and a bandwidth BW within a first time period after the terminal device has handed over from the source cell to the target cell. A reason is that after a BBR algorithm is used, the gain coefficient G of the rate of sending the data by the transmit end may change, or randomly change. However, a change of the G may also affect sizes of the RTT and the BW to some extent. Therefore, in this embodiment of the present disclosure, when the cell handover occurs on the terminal device, a current G of the application server remains unchanged, to reduce fluctuation of the RTT or the BW due to a change of the rate of sending the data.

In the foregoing step S203, for example, in the prior art, only the RTT is a parameter that affects congestion control, to be specific, the congestion control is triggered if the minimum RTT is not touched within a preset time period. After the cell handover occurs on the terminal device, a change may be caused for a cell transmission path, and the change of the transmission path may directly cause an increase or a decrease in the RTT. Therefore, after the cell handover occurs on the terminal device, it is difficult to determine, based on only the RTT, whether the network congestion actually occurs. However, in the method in this embodiment of the present disclosure, not only a changing trend of the RTT is considered, but also a changing trend of the BW needs to be further considered. In other words, only when both the RTT and the BW meet preset conditions, it can be determined that the network congestion actually occurs. Therefore, in the method in this embodiment of the present disclosure, two parameters: the RTT and the BW are simultaneously considered when determining the congestion control. In this way, a probability of erroneous determining of the network congestion is reduced, and it is avoided that a congestion control phase is entered in advance. Therefore, a bearer capability in a data transmission channel is improved, and transmission efficiency is improved.

In a possible implementation, the application server determines a minimum RTT and a maximum BW that are within the first time period after the terminal device has handed over from the source cell to the target cell, and further determines a relationship between the minimum RTT in the first time period and the historical minimum RTT, and a relationship between the maximum BW and the historical maximum BW. The historical minimum RTT is a minimum RTT detected by the application server before the terminal device hands over from the source cell to the target cell, and the historical maximum BW is a maximum BW detected by the application server before the terminal device hands over from the source cell to the target cell. For example, after determining that the terminal device completes the cell handover, the application server detects the minimum RTT and the maximum BW within the first time period. A reason is that when the minimum RTT is relatively large, it indicates that all RTTs within the first time period are relatively large, in other words, the round-trip time of sending the data by the application server is relatively long, and this indicates that at present, the network congestion may occur or the transmission path may become longer. If the maximum bandwidth is relatively small, it indicates that all bandwidth within the first time period is small, in other words, a bandwidth occupation rate is high.

Further, that the application server determines, based on the detection values of the RTT and the BW, whether the network congestion occurs on the link from the application server to the terminal device is specifically: If the minimum RTT is greater than the historical minimum RTT and the maximum BW is less than the historical maximum BW, the application server determines that the network congestion occurs on the link from the application server to the terminal device. Further, when determining that congestion occurs in the current network, the application server continues to keep the G as 1, and may simultaneously reduce the congestion window, to relieve the current network congestion. It can be understood that the first time period may be 10 s, 5 s, or the like. A specific value of the first time period is not limited in this application.

In a possible implementation, if the minimum RTT is greater than the historical minimum RTT and the maximum BW is greater than or equal to the historical maximum BW, the application server determines that no network congestion occurs on the link from the application server to the terminal device. Further, when determining that no congestion occurs in the current network, the application server sequentially and cyclically selects a value from n values in a preset set N for G, where n is an integer greater than or equal to 1. This can be understood as that, when determining that no congestion occurs in the current network, the application server may perform the congestion control according to a PROBE_BW state of the BBR algorithm in the prior art.

Further, the application server updates the historical minimum RTT to the minimum RTT within the first time period. In the prior art, a principle of updating the historical minimum RTT is as follows: If an RTT detected in real time by the application server is smaller than the previous historical minimum RTT, the application server updates the smaller RTT to the historical minimum RTT. However, in this embodiment of this application, if the minimum RTT within the first time period is greater than the historical minimum RTT, and the minimum RTT within the first time period increases due to an increase in the transmission path, it is likely that all the RTTs cannot be less than the historical minimum RTT detected before the cell handover. Therefore, in this embodiment of the present disclosure, even if the minimum RTT within the first time period is greater than the historical minimum RTT, the historical minimum RTT needs to be updated to the minimum RTT within the first time period. In this way, a step of frequently comparing the maximum BW with the historical maximum BW caused by a result that the minimum RTT within each subsequent first time period cannot be touched is prevented from being triggered, and a resource is prevented from being wasted. In this embodiment of the present disclosure, the probability of the erroneous determining of the network congestion is reduced, and it is avoided that the congestion control phase is entered in advance. Therefore, the bearer capability in the data transmission channel is improved, and the transmission efficiency is improved.

It can be understood that if the minimum RTT detected within the first time period is less than the historical minimum RTT detected before the terminal device performs the cell handover, the application server determines that no network congestion occurs on the link from the application server to the terminal device. In this case, it is likely that all the RTTs are shortened because the transmission path is shortened, so that the minimum RTT within the first time period needs to be updated to a latest historical minimum RTT.

Therefore, in this embodiment of the present disclosure, regardless of whether the minimum RTT within the first time period is greater than or less than the historical minimum RTT, the historical minimum RTT needs to be updated to the minimum RTT within the first time period. In other words, an update of the historical minimum RTT after the cell handover is performed by comparing all the RTTs after the cell handover. This can be understood as that a historical minimum RTT corresponding to a cell is generated in the same cell, and comparison between minimum RTTs in different cells (a cell before a handover and a cell after the handover) may be meaningless, and may lead to the erroneous determining of the network congestion.

In conclusion, provided that the cell handover occurs on the terminal device, regardless of whether the minimum RTT within the first time period is less than the historical minimum RTT, the minimum RTT within the first time period needs to be updated to the historical minimum RRT, so that after handing over to a new cell, the terminal device performs reference comparison on the RTT by using a transmission path of the new cell as a new reference standard.

Figure 8A:
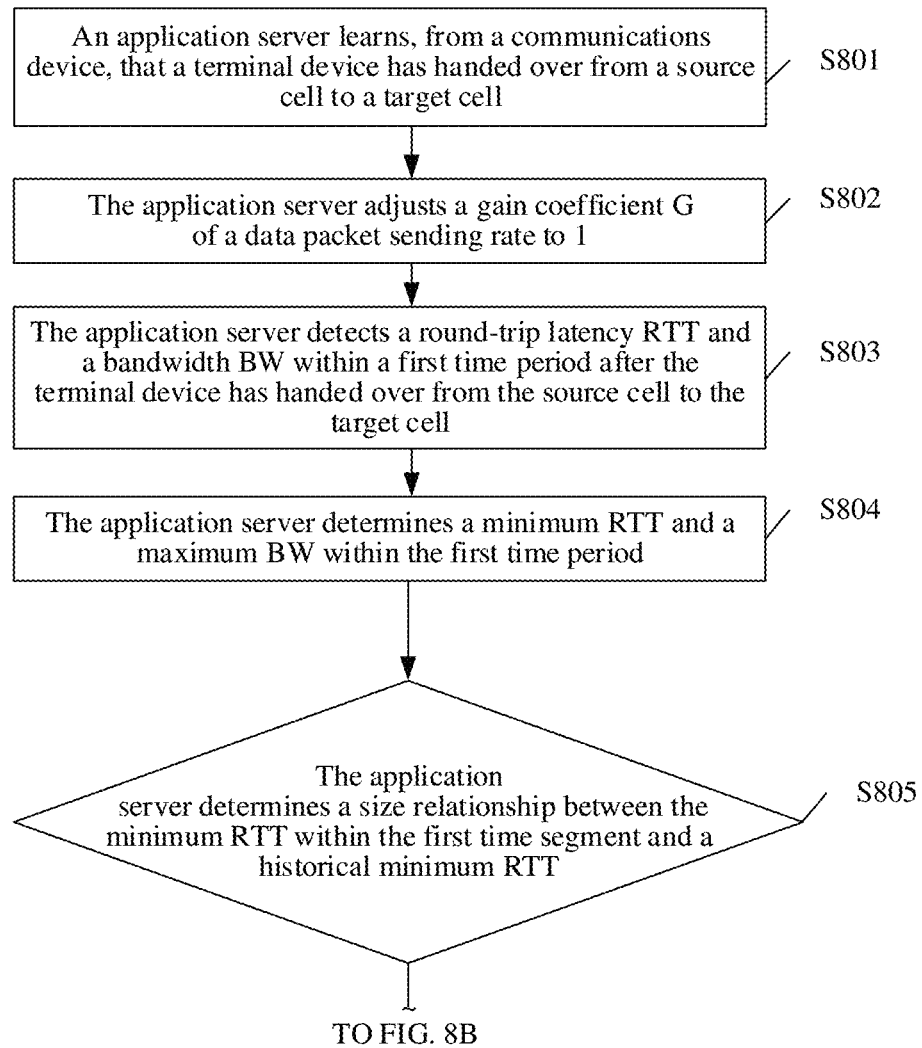
FIG. 8A and FIG. 8B are a schematic flowchart of a specific application scenario of congestion control according to an embodiment of the present disclosure.
Figure 8B:
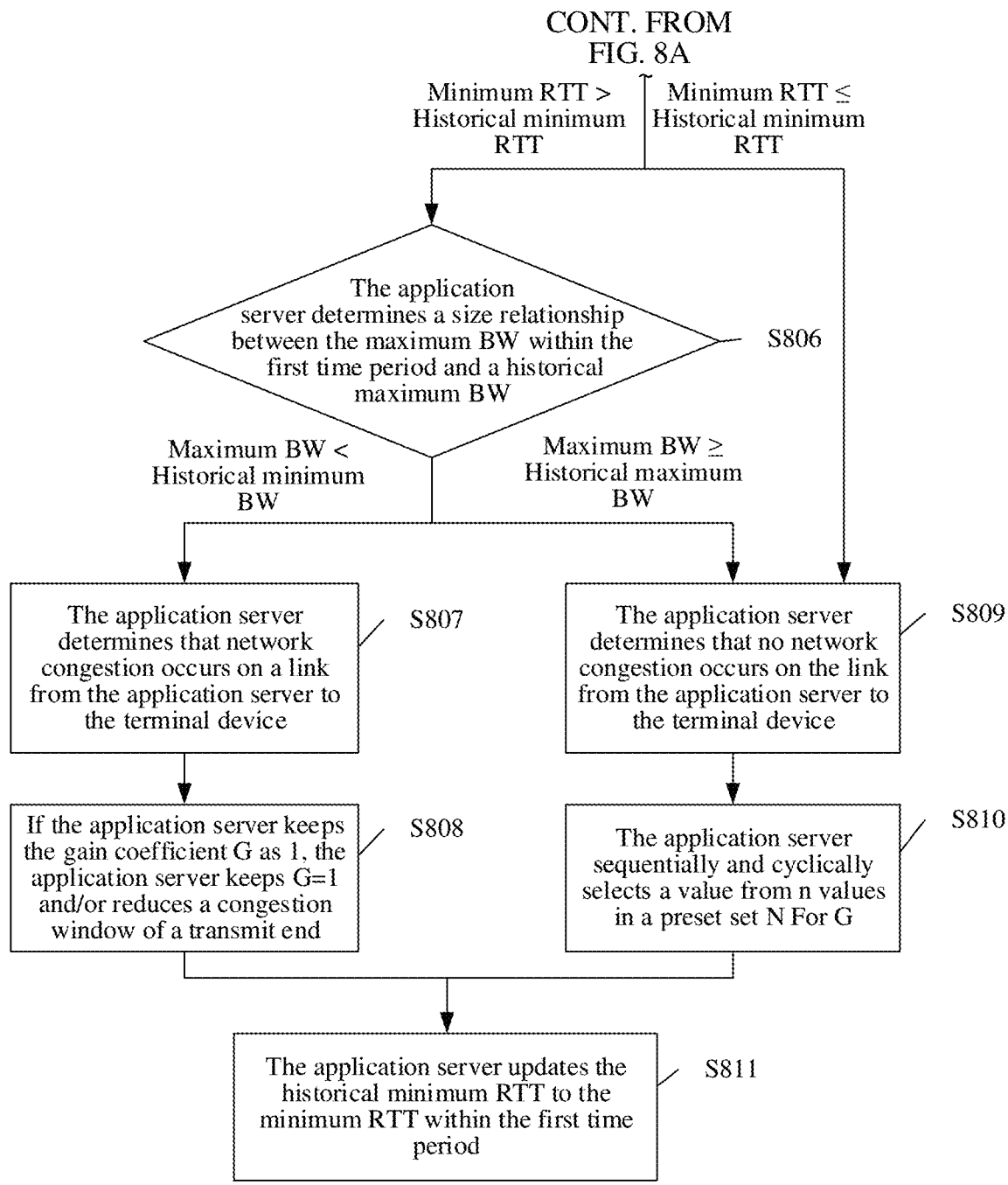

FIG. 8A and FIG. 8B are a schematic flowchart of a specific application scenario of congestion control according to an embodiment of the present disclosure. The method may be applied to the foregoing communications system in FIG. 1. The following describes the method from an application server side with reference to FIG. 8A and FIG. 8B. The method may include the following step S801 to step S811.

S801. An application server learns, from a communications device, that a terminal device has handed over from a source cell to a target cell.

S802. The application server adjusts a gain coefficient G of a data packet sending rate to 1.

S803. The application server detects a round-trip time RTT and a bandwidth BW within a first time period after the terminal device has handed over from the source cell to the target cell.

S804. The application server determines a minimum RTT and a maximum BW within the first time period.

S805. Determine a size relationship between the minimum RTT within the first time period and a historical minimum RTT.

S806. If the minimum RTT>the historical minimum RTT, determine a size relationship between the maximum BW within the first time period and historical maximum BW.

S807. If the maximum BW<the historical minimum BW, the application server determines that network congestion occurs on a link from the application server to the terminal device.

S808. If the application server keeps the gain coefficient G as 1, the application server keeps G=1 and/or reduces a congestion window of the transmit end.

S809. If the minimum RTT>the historical minimum RTT, and the maximum BW≥the historical maximum BW, or the minimum RTT≤the historical minimum RTT, the application server determines that no network congestion occurs on a link from the application server to the terminal device.

S810. Sequentially and cyclically select a value from n values in a preset set N for G.

S811. The application server updates the historical minimum RTT to the minimum RTT within the first time period.

In a specific application scenario of this embodiment of the present disclosure, the application server performs the congestion control method in this application after a cell handover occurs on the terminal device. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

Figure 9:
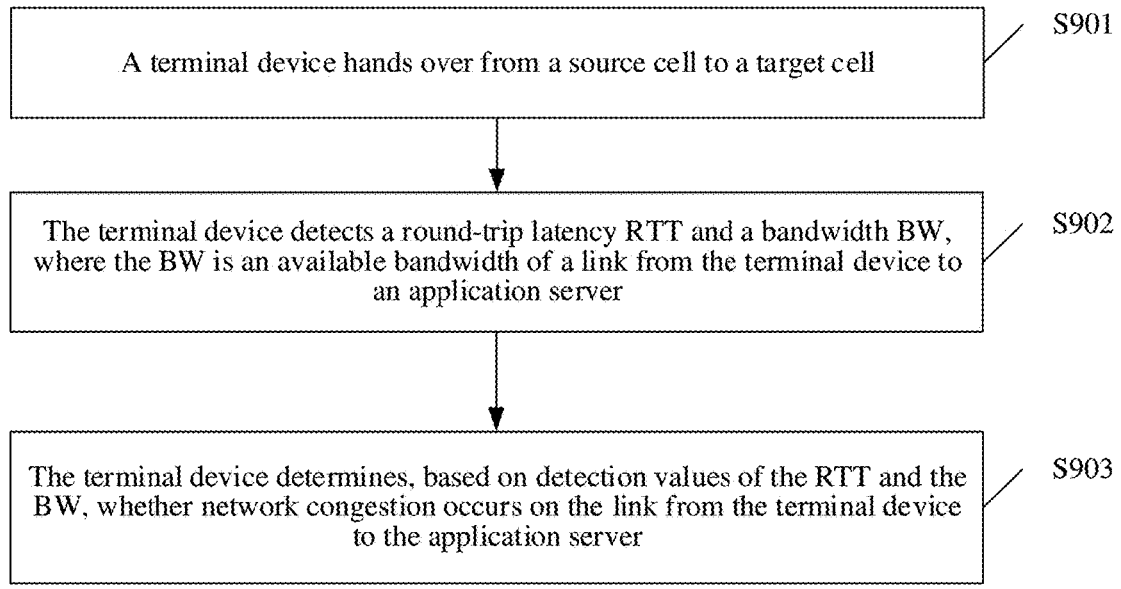
FIG. 9 is a schematic flowchart of another congestion control method according to an embodiment of the present disclosure.

FIG. 9 is a schematic flowchart of another congestion control method according to an embodiment of the present disclosure. The method may be applied to the foregoing communications system in FIG. 1. The following describes the method from a terminal device side with reference to FIG. 9. The method may include the following steps S901 to S903.

Step S901: A terminal device hands over from a source cell to a target cell.

For example, the terminal device completes a process of handing over from the source cell to the target cell.

Step S902: The terminal device detects a round-trip time RTT and a bandwidth BW, where the BW is an available bandwidth of a link from the terminal device to an application server.

For example, a manner in which the terminal device detects the round-trip time RTT and the bandwidth BW is similar to a manner in which the application server detects the round-trip time RTT and the bandwidth BW. For details, refer to a description of detecting, by the application server, the round-trip time RTT and the bandwidth BW in the embodiment corresponding to FIG. 2. Details are not described herein again.

Step S903: The terminal device determines, based on detection values of the RTT and the BW, whether network congestion occurs on the link from the terminal device to the application server.

For example, a manner in which the terminal device determines, based on the detection values of the RTT and the BW, whether the network congestion occurs on the link from the terminal device to the application server is similar to a manner that is in the embodiment corresponding to FIG. 2 and in which the application server determines, based on the detection values of the RTT and the BW, whether the network congestion occurs on a link from the terminal device to the application server. Details are not described herein again.

In a specific application scenario of this embodiment of the present disclosure, the terminal device performs the congestion control method in this application after a cell handover occurs on the terminal device. In this way, it is avoided that BBR erroneously determines path congestion due to an increase in the RTT because of the cell handover of the terminal device, and therefore, an unnecessary reduction in a sending rate or a congestion window is avoided. Therefore, transport layer performance is ensured.

The methods in the embodiments of the present disclosure are described in detail above, and relative apparatuses in the embodiments of the present disclosure are provided below.

Figure 10:
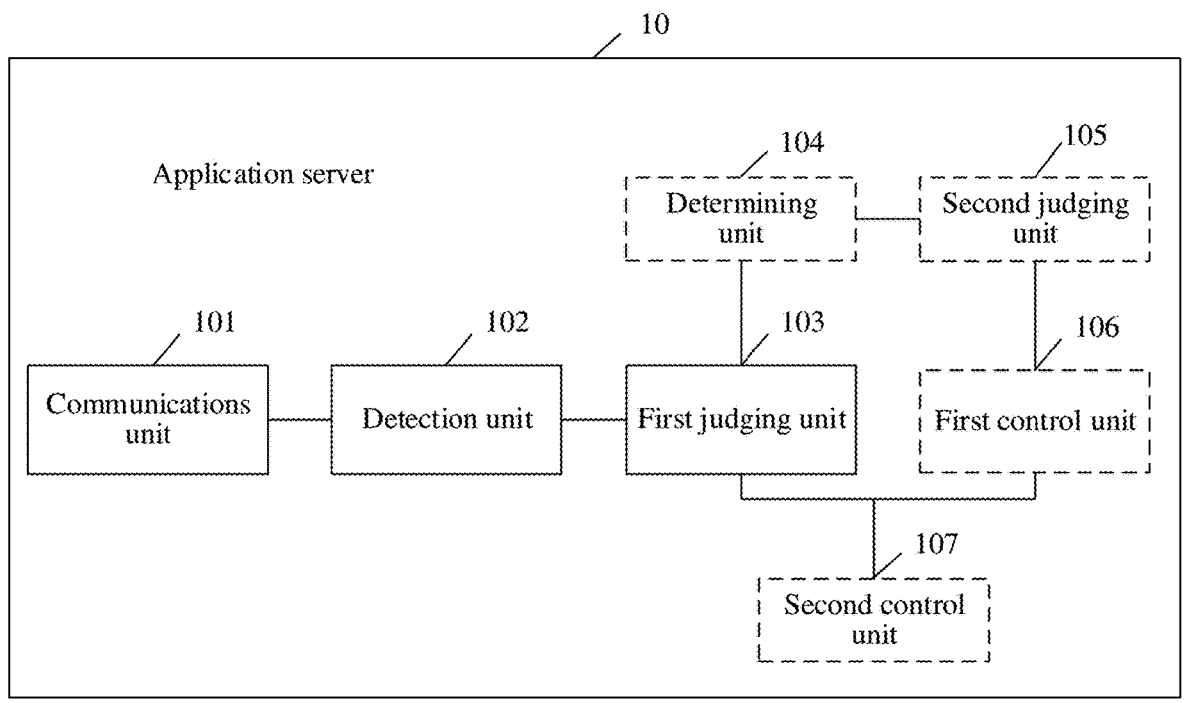
FIG. 10 is a schematic structural diagram of an application server according to an embodiment of the present disclosure.

FIG. 10 is a schematic structural diagram of an application server according to an embodiment of the present disclosure. The application server 10 may include a communications unit 101, a detection unit 102, and a first judging unit 103. Detailed descriptions of the units are as follows.

The communications unit 101 is configured to learn, from a communications device, that a terminal device has handed over from a source cell to a target cell.

The detection unit 102 is configured to detect a round-trip time RTT and a bandwidth BW, where the BW is an available bandwidth of a link from the application server to the terminal device.

The first judging unit 103 is configured to determine, based on detection values of the RTT and the BW, whether network congestion occurs on the link from the application server to the terminal device.

In a possible implementation, the communications device is the terminal device, a target base station, or a core network element, and the target cell is a serving cell of the target base station.

In a possible implementation, the core network element includes any one of a packet data network gateway P-GW, a serving gateway S-GW, a service capability exposure function SCEF network element, an access and mobility management function AMF network element, a session management function SMF network element, and a user plane function UPF network element.

In a possible implementation, the detection unit 102 is specifically configured to: adjust a gain coefficient G of a data packet sending rate to 1, and detect a round-trip time RTT and a bandwidth BW within a first time period after the terminal device has handed over from the source cell to the target cell.

In a possible implementation, the application server 10 further includes: a determining unit 104, configured to determine a minimum RTT and a maximum BW within the first time period.

The first judging unit 103 is specifically configured to: if the minimum RTT is greater than a historical minimum RTT and the maximum BW is less than a historical maximum BW, determine that the network congestion occurs on the link from the application server to the terminal device, where the historical minimum RTT is a minimum RTT detected by the application server before the terminal device hands over from the source cell to the target cell, and the historical maximum BW is a maximum BW detected by the application server before the terminal device hands over from the source cell to the target cell.

In a possible implementation, the application server 10 further includes: a second judging unit 105, configured to: if the minimum RTT is greater than the historical minimum RTT and the maximum BW is greater than or equal to the historical maximum BW, determine that no network congestion occurs on the link from the application server to the terminal device.

In a possible implementation, the application server 10 further includes: a first control unit 106, configured to sequentially and cyclically select a value from n values in a preset set N for G, where n is an integer greater than or equal to 1.

In a possible implementation, the application server 10 further includes: a second control unit 107, configured to update the historical minimum RTT to the minimum RTT within the first time period.

It should be noted that for functions of function units in the application server 10 described in this embodiment of the present disclosure, reference may be made to related descriptions of step S201 to step S203 in the foregoing method embodiment described in FIG. 2. Details are not described herein again.

Figure 11:
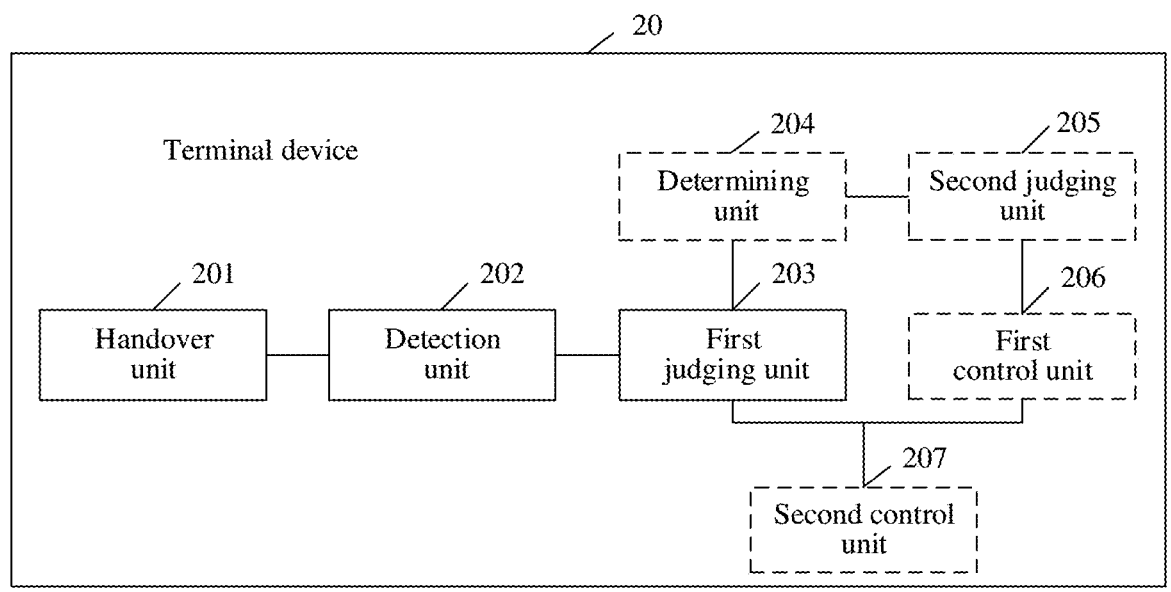
FIG. 11 is a schematic structural diagram of a terminal device according to an embodiment of the present disclosure.

FIG. 11 is a schematic structural diagram of a terminal device according to an embodiment of the present disclosure. The terminal device 20 may include a handover unit 201, a detection unit 202, and a first judging unit 203. Detailed descriptions of the units are as follows.

The handover unit 201 is configured to perform a handover from a source cell to a target cell.

The detection unit 202 is configured to detect a round-trip time RTT and a bandwidth BW, where the BW is an available bandwidth of a link from the terminal device to the application server.

The first judging unit 203 is configured to determine, based on detection values of the RTT and the BW, whether network congestion occurs on the link from the terminal device to the application server.

In a possible implementation, the detection unit 202 is specifically configured to: adjust a gain coefficient G of a data packet sending rate to 1, and detect a round-trip time (RTT) and a bandwidth (BW) within a first time period after the terminal device has handed over from the source cell to the target cell.

In a possible implementation, the terminal device 20 further includes: a determining unit 204, configured to determine a minimum RTT and a maximum BW within the first time period.

The first judging unit 203 is specifically configured to: if the minimum RTT is greater than a historical minimum RTT and the maximum BW is less than a historical maximum BW, determine that the network congestion occurs on the link from the terminal device to the application server, where the historical minimum RTT is a minimum RTT detected by the terminal device before the terminal device hands over from the source cell to the target cell, and the historical maximum BW is a maximum BW detected by the terminal device before the terminal device hands over from the source cell to the target cell.

In a possible implementation, the terminal device 20 further includes: a second judging unit 205, configured to: if the minimum RTT is greater than the historical minimum RTT and the maximum BW is greater than or equal to the historical maximum BW, determine that no network congestion occurs on the link from the terminal device to the application server.

In a possible implementation, the terminal device 20 further includes: a first control unit 206, configured to sequentially and cyclically select a value from n values in a preset set N for G, where n is an integer greater than or equal to 1.

In a possible implementation, the terminal device 20 further includes: a second control unit 207, configured to update the historical minimum RTT to the minimum RTT within the first time period.

It should be noted that for functions of function units in the terminal device 20 described in this embodiment of the present disclosure, reference may be made to related descriptions of step S901 to step S903 in the foregoing method embodiment described in FIG. 9. Details are not described herein again.

Figure 12:
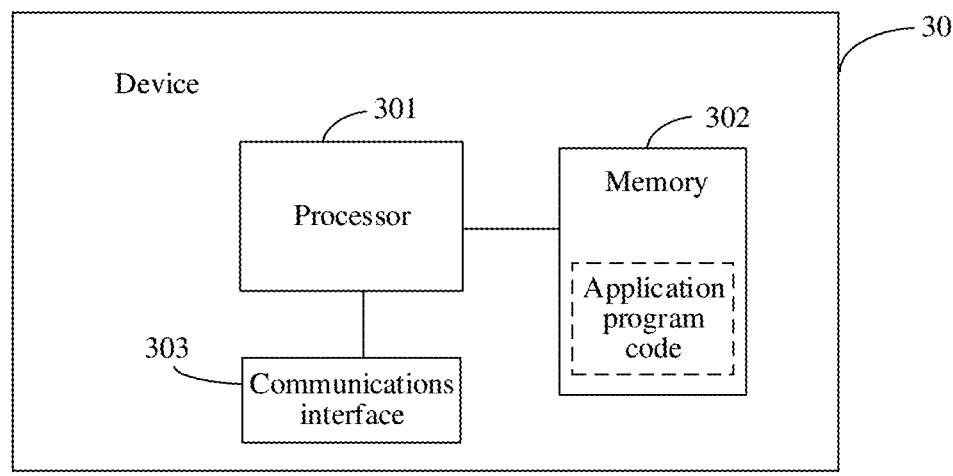
FIG. 12 is a schematic structural diagram of a device according to an embodiment of the present disclosure.

FIG. 12 is a schematic structural diagram of a device according to an embodiment of the present disclosure. Both the application server 10 and the terminal device 20 may be implemented by using a structure in FIG. 12. The device 30 includes at least one processor 301, at least one memory 302, and at least one communications interface 303. In addition, the device may further include general components such as an antenna. Details are not described herein.

The processor 301 may be a general-purpose central processing unit (CPU), a microprocessor, an application-specific integrated circuit (ASIC), or one or more integrated circuits configured to control execution of the foregoing solution program.

The communications interface 303 is configured to communicate with another device or a communications network, such as the Ethernet, a radio access network (RAN), a core network, or a wireless local area network (WLAN).

The memory 302 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using a bus. Alternatively, the memory may be integrated with the processor.

The memory 302 is configured to store application program code for executing the foregoing solution, and the processor 301 controls the execution. The processor 301 is configured to execute the application program code stored in the memory 302.

When the device shown in FIG. 12 is the application server 10, the code stored in the memory 302 may execute the foregoing congestion control method provided in FIG. 2. For example, the method includes: learning, from a communications device, that a terminal device has handed over from a source cell to a target cell; detecting a round-trip time RTT and a bandwidth BW, where the BW is an available bandwidth of a link from the application server to the terminal device; and determining, based on detection values of the RTT the BW, whether network congestion occurs on the link from the application server to the terminal device.

It should be noted that for functions of function units in the application server 10 described in this embodiment of the present disclosure, reference may be made to related descriptions of step S201 to step S203 in the foregoing method embodiment described in FIG. 2. Details are not described herein again.

When the device shown in FIG. 12 is the terminal device 20, the code stored in the memory 302 may execute the foregoing congestion control method provided in FIG. 9. For example, the method includes: performing a handover from a source cell to a target cell; detecting a round-trip time RTT and a bandwidth BW, where the BW is an available bandwidth of a link from the terminal device to an application server; and determining, based on detection values of the RTT and the BW, whether network congestion occurs on the link from the terminal device to the application server.

It should be noted that for functions of function units in the application server 10 described in this embodiment of the present disclosure, reference may be made to related descriptions of step S901 to step S903 in the foregoing method embodiment described in FIG. 9. Details are not described herein again.

The embodiments of the present disclosure further provide a computer storage medium. The computer storage medium may store a program, and, when the program is executed, at least a part or all of the steps of any method in the foregoing embodiments may be performed.

An embodiment of the present disclosure further provides a computer program, and the computer program includes an instruction. When the computer program is executed by a computer, the computer is enabled to perform some or all steps of any congestion control method.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
   handing over, by a terminal device, from a source cell to a target cell;
   detecting, by the terminal device, a round-trip time (RTT) and a bandwidth (BW), to determine one or more detection values of the RTT and one or more detection values of the BW, wherein the BW is an available bandwidth of a link from the terminal device to an application server, and wherein detecting the RTT and the BW, to determine the one or more detection values of the RTT and the one or more detection values of the BW, comprises:
   adjusting, by the terminal device, a gain coefficient (G) of a data packet sending rate to 1; and
   detecting, by the terminal device, the RTT and the BW within a first time period after the terminal device has handed over from the source cell to the target cell, to determine the one or more detection values of the RTT and the one or more detection values of the BW;
   determining, by the terminal device, a minimum RTT detection value and a maximum BW detection value based on the one or more detection values of the RTT and the one or more detection values of the BW; and
   determining, by the terminal device based on the minimum RTT detection value and the maximum BW detection value, whether network congestion occurs on the link from the terminal device to the application server, wherein determining whether network congestion occurs on the link comprises:
   in response to the minimum RTT detection value being greater than a historical minimum RTT detection value, and the maximum BW detection value being less than a historical maximum BW detection value, determining, by the terminal device, that network congestion occurs on the link from the terminal device to the application server, wherein the historical minimum RTT detection value is a minimum RTT detection value detected by the terminal device before the terminal device is handed over from the source cell to the target cell, and the historical maximum BW detection value is a maximum BW detection value detected by the terminal device before the terminal device is handed over from the source cell to the target cell.

2. The method according to claim 1, further comprising:
   updating, by the terminal device, the historical minimum RTT detection value to the minimum RTT detection value within the first time period.

3. The method according to claim 1, wherein determining whether network congestion occurs on the link further comprises:
   in response to the minimum RTT detection value being greater than the historical minimum RTT detection value, and the maximum BW detection value being greater than or equal to the historical maximum BW detection value, determining, by the terminal device, that no network congestion occurs on the link from the terminal device to the application server.

4. The method according to claim 3, further comprising:
sequentially and cyclically selecting a value for G from n values in a preset set N, wherein n is an integer greater than or equal to 1.

5. The method according to claim 3, further comprising:
updating, by the terminal device, the historical minimum RTT detection value to the minimum RTT detection value within the first time period.

6. A terminal device, comprising:
an interface;
a processor; and
a non-transitory computer-readable storage medium storing a program to be executed by the processor, the program including instructions to:
perform a handover from a source cell to a target cell;
detect a round-trip time (RTT) and a bandwidth (BW), to determine one or more detection values of the RTT and one or more detection values of the BW, wherein the BW is an available bandwidth of a link from the terminal device to an application server, and wherein detecting the RTT and the BW, to determine the one or more detection values of the RTT and the one or more detection values of the BW, comprises:
adjusting a gain coefficient (G) of a data packet sending rate to 1; and
detecting the RTT and the BW within a first time period after the terminal device has handed over from the source cell to the target cell, to determine the one or more detection values of the RTT and the one or more detection values of the BW;
determine a minimum RTT detection value and a maximum BW detection value based on the one or more detection values of the RTT and the one or more detection values of the BW; and
determine, based on the minimum RTT detection value and the maximum BW detection, whether network congestion occurs on the link from the terminal device to the application server, wherein determining whether network congestion occurs comprises:
in response to the minimum RTT detection value being greater than a historical minimum RTT detection value and the maximum BW detection value being greater than or equal to a historical maximum BW detection value, determining that no network congestion occurs on the link from the terminal device to the application server.

7. The terminal device according to claim 6, wherein the program includes instructions to:
in response to the minimum RTT detection value being greater than the historical minimum RTT detection value, and the maximum BW detection value being less than the historical maximum BW detection value, determine that the network congestion occurs on the link from the terminal device to the application server, wherein the historical minimum RTT detection value is a minimum RTT detection value detected by the terminal device before the terminal device is handed over from the source cell to the target cell, and the historical maximum BW detection value is a maximum BW detection value detected by the terminal device before the terminal device is handed over from the source cell to the target cell.

8. The terminal device according to claim 7, wherein the program further includes instructions to update the historical minimum RTT detection value to the minimum RTT detection value within the first time period.

9. The terminal device according to claim 6, wherein the program includes instructions to:
sequentially and cyclically select a value for G from n values in a preset set N, wherein n is an integer greater than or equal to 1.

10. The terminal device according to claim 6, wherein the program further includes instructions to:
update the historical minimum RTT detection value to the minimum RTT detection value within the first time period.

11. A non-transitory computer-readable medium storing computer instructions for execution by one or more processors, wherein the computer instructions instruct the one or more processors to:
hand over from a source cell to a target cell;
detect a round-trip time (RTT) and a bandwidth (BW), to determine one or more detection values of the RTT and one or more detection values of the BW, wherein the BW is an available bandwidth of a link from a terminal device to an application server, and wherein detecting the RTT and the BW, to determine one or more detection values of the RTT and one or more detection values of the BW, comprises:
adjusting a gain coefficient G of a data packet sending rate to 1; and
detecting the RTT and the BW within a first time period after the terminal device has handed over from the source cell to the target cell, to determine the one or more detection values of the RTT and the one or more detection values of the BW; determine a minimum RTT detection value and a maximum BW detection value based on the one or more detection values of the RTT and the one or more detection values of the BW; and
determine, based on the minimum RTT detection value and the maximum BW detection value, whether network congestion occurs on the link from the terminal device to the application server, wherein determining whether network congestion occurs on the link comprises:
in response to the minimum RTT detection value being greater than a historical minimum RTT detection value, and the maximum BW detection value being less than a historical maximum BW detection value, determining that the network congestion occurs on the link from the terminal device to the application server, wherein the historical minimum RTT detection value is a minimum RTT detection value detected by the terminal device before the terminal device is handed over from the source cell to the target cell, and the historical maximum BW detection value is a maximum BW detection value detected by the terminal device before the terminal device hands over from the source cell to the target cell.

12. The medium according to claim 11, wherein the computer instructions instruct the one or more processors to update the historical minimum RTT detection value to the minimum RTT detection value within the first time period.

13. The medium according to claim 11, wherein determining whether network congestion occurs on the link comprises:

in response to the minimum RTT detection value being greater than the historical minimum RTT detection value, and the maximum BW detection value being greater than or equal to the historical maximum BW detection value, determining that no network congestion occurs on the link from the terminal device to the application server.

14. The medium according to claim 13, wherein the computer instructions further instruct the one or more processors to:
sequentially and cyclically select a value for G from n values in a preset set N, wherein n is an integer greater than or equal to 1.

* * * * *